United States Patent
Yen et al.

(10) Patent No.: US 8,324,303 B2
(45) Date of Patent: Dec. 4, 2012

(54) SURGE-RESISTANT AND ABRASION-RESISTANT FLEXIBLE INSULATING ENAMEL

(75) Inventors: Wei-Jung Yen, Taoyuan Hsien (TW); Wei-Chih Yang, Taoyuan Hsien (TW); Chun-Yu Huang, Taoyuan Hsien (TW)

(73) Assignee: Fu Pao Chemical Co., Ltd., Kuanin Township, Taoyuan Hsien (TW)

( * ) Notice: Subject to any disclaimer, the term of this patent is extended or adjusted under 35 U.S.C. 154(b) by 34 days.

(21) Appl. No.: 13/176,617

(22) Filed: Jul. 5, 2011

(65) Prior Publication Data
US 2011/0263772 A1 Oct. 27, 2011

Related U.S. Application Data

(63) Continuation-in-part of application No. 12/705,507, filed on Feb. 12, 2010, now abandoned.

(30) Foreign Application Priority Data
Nov. 19, 2009 (TW) .............................. 98139280 A

(51) Int. Cl.
C08K 3/34 (2006.01)
H01B 7/18 (2006.01)
H01B 3/10 (2006.01)
(52) U.S. Cl. ...... 524/445; 524/446; 524/449; 174/110 R
(58) Field of Classification Search .......... 524/445–447, 524/449; 174/110 R
See application file for complete search history.

(56) References Cited

U.S. PATENT DOCUMENTS

| 4,476,192 A | 10/1984 | Imai et al. |
| 4,493,873 A | 1/1985 | Keane et al. |
| 5,654,095 A | 8/1997 | Yin et al. |
| 6,242,096 B1 * | 6/2001 | Wolter et al. ................. 428/377 |
| 6,555,610 B1 | 4/2003 | Blanton et al. |
| 6,906,258 B2 | 6/2005 | Hirai et al. |
| 6,911,258 B1 | 6/2005 | Prigent et al. |
| 2001/0018981 A1 | 9/2001 | Yin et al. |
| 2005/0142349 A1 | 6/2005 | Irwin et al. |
| 2006/0240255 A1 * | 10/2006 | Kikuchi et al. ............... 428/375 |

FOREIGN PATENT DOCUMENTS

| JP | 59-176363 A | 10/1984 |
| JP | 2005-190699 A | 7/2005 |

* cited by examiner

*Primary Examiner* — Ling Choi
*Assistant Examiner* — Brieann R Fink
(74) *Attorney, Agent, or Firm* — patenttm.us

(57) ABSTRACT

A surge-resistant and abrasion resistant flexible insulating enamel has resin in an amount of 12 wt % to 76 wt % per 100 wt % by weight of the enamel, an organic solvent in an amount of 20 wt % to 80 wt % per 100 wt % by weight of the enamel, polyethylene oxide (PEO) intercalated clay in an amount of 0.005 wt % to 16 wt % per 100 wt % by weight of the enamel, and polysilicic acid in an amount of 0.995 wt % to 16 wt % per 100 wt % by weight of the enamel. The clay and polysilicic acid have high dielectric constant to absorb, evenly disperse and evacuate surges, preventing an insulating layer made by the insulating enamel from being damaged from the surge. PEO provides the insulating layer having good flexibility and adhesion.

18 Claims, 1 Drawing Sheet

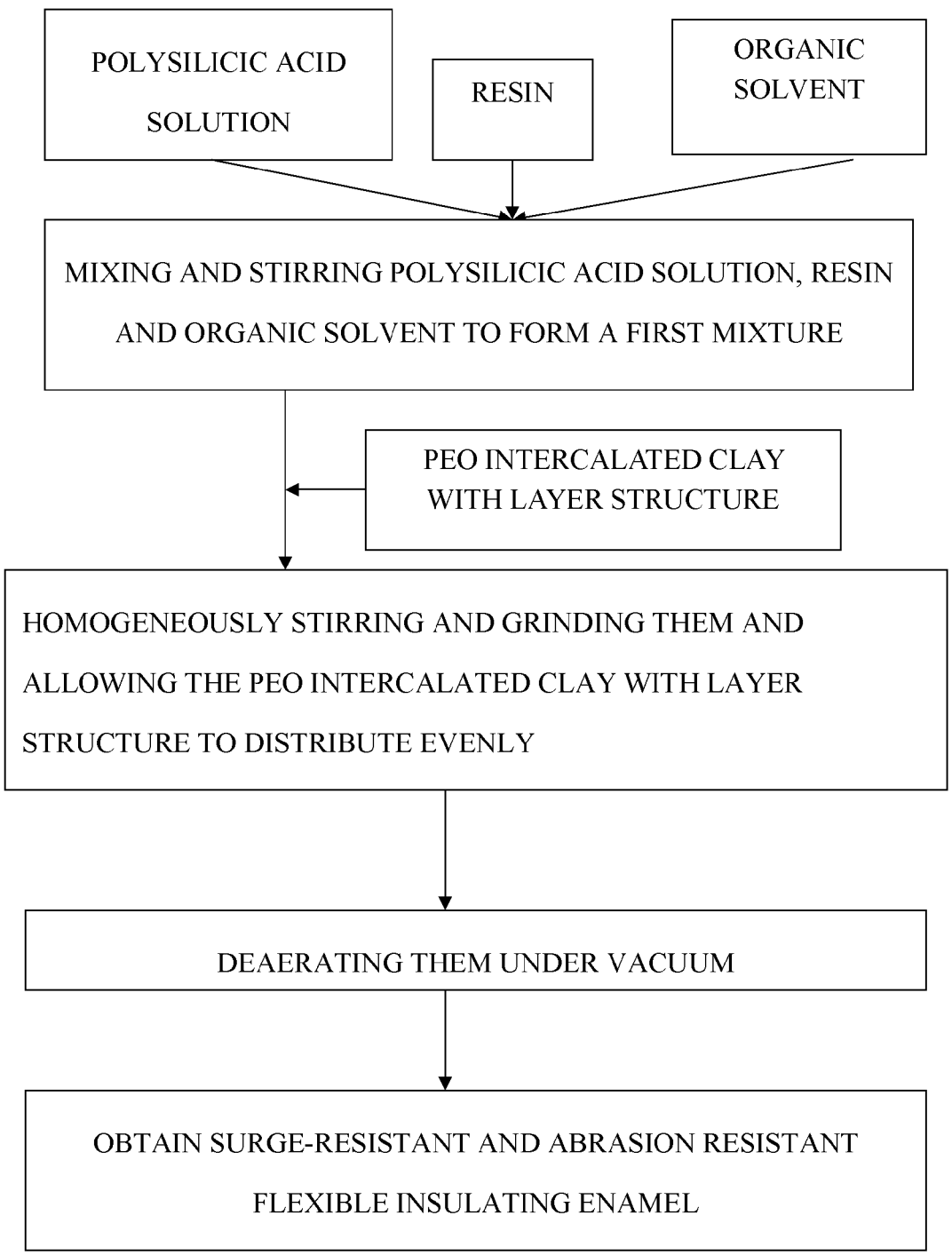

SURGE-RESISTANT AND ABRASION-RESISTANT FLEXIBLE INSULATING ENAMEL

RELATED APPLICATION

The present invention is a Continuation-in-Part (CIP) of U.S. patent application Ser. No. 12/705,507 filed on Feb. 12, 2010, which is incorporated by reference in the present application in its entirety.

BACKGROUND OF THE INVENTION

1. Field of Invention The present invention relates to an insulating enamel and more particularly to a surge-resistant insulating enamel with excellent abrasion resistance and flexibility for application to a conductor to form an enameled wire.

2. Description of the Related Art

Recent environmental events have encouraged many countries to save energy and reduce $CO_2$ emission. Therefore, several protocols and strategies have been established, including energy-saving inverters. Inverters control the rotation speed of the motor by changing voltage and frequency. Therefore, the motor has improved loading and drive efficiencies. Accordingly, regenerative power can be used for a motor with the inverter because the inverter saves energy.

Inverters can also be applied to various other systems, including intelligent power modules (IPMs) using the inverter due to its small size and reduced cost. Furthermore, multiple inverters may be connected to each other to form an inverter network for building remote control and maintenance system or the like.

Power stations transmit electricity with normal voltage (110 volt). A surge occurs when transient voltage is higher than the normal voltage. The surge can be observed in an oscilloscope, which presents an abnormally high and abrupt pulse among a series of stable pulses, which also means voltage level or current changes suddenly during a series of stable signals. Reasons for generation of surge include, for example, lightning, breakdown of power system or the like. Although the power station has protection mechanism, some surges may still be transmitted because the protection mechanism has a limit. Furthermore, the protection mechanism may generate a surge resulting in, for example, a switch in a house being turned on or off. Sometimes, the surge may destroy electronic devices such as computers, televisions, stereos or the like since their resistant ability against surge is insufficient.

An inverter itself also generates surges. When the inverter drives a motor, the inverters generates a pulse current, called "inverter surge", which may damage insulating properties of enameled wire around the motor and interrupt magnetic field of motor, relay, transformer or the like. Generally speaking, surge applies extremely huge loading to the enameled wire. If the enameled wire insulating material does not have sufficient insulating strength or cannot evacuate the loading, an insulating layer is easily broken or destroyed, so a coil wound by the enameled wire may cause short-circuit or transmit unstably, and then the electronic devices cannot function normally or are damaged. Even surge absorber cannot resolve above problems thoroughly. Therefore, insulating material for enameled wire with surge resistance is the key to developing inverters.

For satisfying above demand, some surge-resistant insulating materials were developed. In 1985, General Electric Company (U.S. Pat. No. 4,493,873) published a surge-resistant insulating enamel for forming an insulating layer including metal oxide such as alumina. In 1997, Phelps Dodge Industries, Inc. (U.S. Pat. No. 5,654,095) published a surge-resistant insulating enamel for forming an insulating layer including metallic oxides such as $TiO_2$, $Al_2O_3$, $Cr_2O_3$, ZnO, or the like. Owing to high dielectric constant of the metallic oxides, the metallic oxides are able to absorb, disperse or evacuate surges, so the insulating layer will not be damaged. For further avoiding damage from surges, multiple layers of coating are applied to an enameled wire. For example, a conductor is coated with a surge-resistant insulating enamel and then is coated with an organic insulating protective coating, so the organic insulating protective coating is able to offset the surge after the surge penetrates the surge-resistant insulating layer. Interface compatibility between the metallic oxides and organic insulating materials is important. If interface compatibility between them is poor, the metallic oxides agglomerate easily to form particles with large sizes. Hence, the metallic oxides are distributed heterogeneously, which lowers dispersion and evacuation of surges.

Inorganic material, such as silica ($SiO_2$), efficiently prevents the enameled wire in a motor from damage by surge generated from corona discharge. Organic insulating material added with inorganic material enhances surge-resistance of the insulating layer. However, inorganic material is not soft enough. If inorganic material is distributed heterogeneously, stress occurs in the enameled wire when the enameled wire is wound into a coil, so electrical and mechanical defaults will damage the enameled wire. Apparently, how to distribute inorganic material homogeneously is a major problem.

In addition to metallic oxides or nano organic silica particles, inorganic material with layer structure can also be added into the insulating layer. JP patent No. 2005-190699, U.S. Pat. Nos. 4,476,192, 5,654,095, 6,906,258 and 2005-0142349 disclose that inorganic material with layer structure improves withstanding pot life of enameled wire for resisting surges. The inorganic material may be modified. As mentioned in the above patents, the inorganic material has a layer structure, wherein the silicate layers and adjacent layers are intercalated by quaternary ammonium salts or quaternary phosphonium salts. Unfortunately, the quaternary ammonium or phosphonium salts may affect the crosslinking density of the insulating polymer, and then results in the brittle insulating layer peeling off from the conductor.

US patent No. 2001/001891 teaches an insulation material which is resistant to high voltage prepared with a polymer resin and inorganic particulate including metal oxides, such as fumed silica. The inorganic particulate including fumed silica are mixed with organic solvent like cresol or phenol. Due to the fumed silica made by a flame hydrolysis process has a small amount of hydroxyl groups on its own surface, the inorganic particulates including fumed silica are distributed heterogeneously over the insulation material and lowering the effectiveness of evacuating surge.

U.S. Pat. No. 6,911,258 teaches an insulation material which has compatibilizing clay with polyethylene oxide and particles including silicate. The insulation material can be modified with compatibilizing clay to increase the dispersity throughout a polymer matrix. However, it is not taught in the patent that the particles comprising/consisting of organic dispersible silica material or silica sol, which has many hydroxyl groups, so it is not sure whether the particles can be distributed evenly in the composition.

To overcome the shortcomings, the present invention provides a surge-resistant and abrasion resistant flexible insulating enamel to mitigate or obviate the aforementioned problems.

SUMMARY OF THE INVENTION

The primary objective of the present invention is to provide a surge-resistant insulating enamel with excellent abrasion resistance and flexibility for being applied to a conductor to form an enameled wire.

To achieve the objective, a surge-resistant and abrasion resistant flexible insulating enamel in accordance with the present invention comprises resin in an amount of 12 wt % to 76 wt % per 100 wt % by weight of the enamel, an organic solvent in an amount of 20 wt % to 80 wt % per 100 wt % by weight of the enamel, polyethylene oxide (PEO) intercalated clay in an amount of 0.005 wt % to 16 wt % per 100 wt % by weight of the enamel, and polysilicic acid in an amount of 0.995 wt % to 16 wt % per 100 wt % by weight of the enamel, wherein the Si—OH functional groups in polysilicic acid are more than $10/nm^2$.

According to the present invention, examples of the suitable organic solvent for applying to the invention comprise, but not limited to, phenol, hydrocarbon solvent, benzene, ester, ketone and a mixture thereof. More particularly, the organic solvent is selected from the group consisting of cresol, dimethyl phenol, toluene, xylene, ethylbenzene, N,N-dimethylformamide (DMF), N-methylpyrrolidone (NMP) and a mixture thereof.

The PEO intercalated clay and polysilic acid both have high dielectric constant that can absorb, evenly disperse and evacuate surges, preventing an insulating layer made by the insulating enamel of the present invention from being damaged from the surge. Furthermore, PEO is flexible, facilitates the clay to distribute uniformly into the resin and can be bonded with the resin, so the insulating layer has good flexibility, adhesion and abrasion resistance.

Other objectives, advantages and novel features of the invention will become more apparent from the following detailed description when taken in conjunction with the accompanying drawings.

BRIEF DESCRIPTION OF THE DRAWINGS

FIG. 1 is a flow chart of a method for manufacturing a surge-resistant and abrasion resistant flexible insulating enamel in accordance with the present invention.

DETAILED DESCRIPTION OF THE INVENTION

A surge-resistant and abrasion resistant flexible insulating enamel in accordance with the present invention comprises resin, an organic solvent, polyethylene oxide (PEO) intercalated clay, and polysilicic acid. The resin is in an amount of 12 wt % to 76 wt % per 100 wt % by weight of the enamel. The resin is selected from the group consisting of polyamideimides (PAI), polyetherimides (PEI), polyesterimides, and polyimides.

The organic solvent is in an amount of 20 wt % to 80 wt % per 100 wt % by weight of the enamel. The organic solvent is selected from the group consisting of phenol, hydrocarbon solvent, benzene, ester, ketone and a mixture thereof. More preferably, the organic solvent is selected from the group consisting of cresol, dimethyl phenol, toluene, xylene, ethylbenzene, N,N-dimethylformamide (DMF), N-methylpyrrolidone (NMP) and a mixture thereof.

The PEO intercalated clay is in an amount of 0.005 wt % to 16 wt % per 100 wt % by weight of the enamel and has clay and PEO intercalation reagent intercalated in the clay. The clay is selected from the group consisting of smectites, micas and vermiculite. The smectites are selected from the group consisting of montmorillonite, hectorite, laponite, saponite, sauconite, beidellite, stevensite and nontronite. The micas are selected from the group consisting of chlorite, phlogopite, lepidolite, muscovite, biotite, paragonite, margarite, taeniolite and tetrasilicic mica. Molecular weight of PEO is between 600 and 1,000,000. A weight ratio of the PEO intercalation reagent to clay is from 20:80 to 45:55. Preferably, the clay has an average particle size smaller than 20 μm.

The polysilicic acid is in an amount of 0.995 wt % to 16 wt % per 100 wt % by weight of the enamel. Preferably, the polysilicic acid has an average size smaller than 50 nm.

A ratio of the PEO intercalated clay to the polysilicic acid is from 0.5:99.5 to 50:50.

A ratio of resin and a combination including the PEO intercalated clay and the polysilicic acid is from 95:5 to 60:40. Preferably, a ratio of resin and a combination including the PEO intercalated clay and the polysilicic acid is from 90:10 to 70:30. More preferably, a ratio of resin and a combination including the PEO intercalated clay and the polysilicic acid is from 80:20 to 75:25.

With reference to FIG. 1, a method for manufacturing the surge-resistant and abrasion resistant flexible insulating enamel in accordance with the present invention comprises mixing resin, organic solvent and polysilic acid solution to form a first mixture; adding PEO intercalated clay into the first mixture to form a second mixture; homogeneously stirring and grinding the second mixture allowing the PEO intercalated clay to distribute evenly; and deaerating the second mixture under vacuum for 30 minutes to obtain the surge-resistant and abrasion resistant flexible insulating enamel.

The surge-resistant and abrasion resistant flexible insulating enamel of the present invention is used to apply around a conductor and is dried to form an insulating layer.

The surge-resistant and abrasion resistant flexible insulating enamel of the present invention contains non-metallic inorganic material including clay (a kind of silicate) and polysilicic acid (a kind of silicate oxide), and has high dielectric constant, excellent strength, hardness, insulation, thermal conductivity, high-temperature resistance, oxidation resistance, corrosion resistance, abrasion resistance and high temperature strength.

Those materials with high dielectric constant can absorb, disperse evenly and evacuate surges (such as effect of electric capacity), preventing the insulating layer of the present invention from being damaged from the surge.

PEO hydroxyl group can be bonded with resin and then exfoliate clay to distribute uniformly into the resin. And, the structure of PEO is soft to improve the flexibility of the insulating layer. Therefore, each insulating layer has good flexibility, adhesion and abrasion resistance.

EXAMPLE

Several examples of the present invention and comparative examples show compositions of coatings of insulating layers of the present invention and those of comparative coatings of insulating layers, which are shown in Table 1.

TABLE 1

| | Resin/ Solid Content (g) | PEO intercalated clay (g) | PEO (g) | Clay (g/wt %) | Polysilicic acid (g/wt %) | Resin (wt %) |
|---|---|---|---|---|---|---|
| Ex. 1 | PEI/380 | 10 | 3 | 7/1.75 | 10/2.5 | 95 |
| Ex. 2 | PEI/320 | 0.4 | 0.12 | 0.28/0.07 | 79.6/19.9 | 80 |

TABLE 1-continued

| | Resin/Solid Content (g) | quaternary ammonium salts intercalated clay (g) | quaternary ammonium salts (g) | Clay (g/wt %) | Polysilicic acid (g/wt %) | Resin (wt %) |
|---|---|---|---|---|---|---|
| Ex. 3 | PEI/300 | 40 | 12 | 28/7 | 60/15 | 75 |
| Ex. 4 | PAI/240 | 30 | 9 | 21/7 | 30/10 | 80 |
| Ex. 5 | PEI/320 | 32 | 9.6 | 22.4/5.6 | 48/12 | 80 |
| Ex. 6 | PEI/320 | 32 | 14.4 | 17.6/4.4 | 48/12 | 80 |
| Comp. Ex. 1 | PEI/360 | 40 | 12 | 28/7 | 0/0 | 90 |
| Comp. Ex. 2 | PEI/280 | 48 | 14.4 | 33.6/8.4 | 72/18 | 70 |
| Comp. Ex. 3 | PAI/300 | 0 | 0 | 0/0 | 0/0 | 100 |
| Comp. Ex. 4 | PAI/240 | 0 | 0 | 0/0 | 60/20 | 80 |

| | Resin/Solid Content (g) | PEO intercalated clay (g) | PEO (g) | Clay (g/wt %) | Fused silica (g/wt %) | Resin (wt %) |
|---|---|---|---|---|---|---|
| Comp. Ex. 5 | PAI/240 | 60 | 18 | 42/14 | 0/0 | 80 |
| Comp. Ex. 6 | PAI/240 | 30 | 9 | 21/7 | 30/10 | 80 |

Example 1

950 g polyetherimide (PEI) solution (solid content: 40%, organic solution including 470 g cresol, 70 g NMP, 30 g xylene) and 50.0 g polysilicic acid solution [including 20 wt % polysilicic acid (10 g polysilicic acid), marketed by CHANG CHUN] were poured into a 1000-ml beaker and were stirred with high speed under room temperature for 30 minutes. 10.0 g PEO intercalated clay (Laponite RDS) was added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Example 2

800 g polyetherimide (PEI) solution (solid content: 40%, organic solution including 380 g cresol, 70 g NMP, 30 g xylene) and 398.0 g polysilicic acid solution (79.6 g polysilicic acid) were poured into a 1000-ml beaker and were stirred with high speed under room temperature for 30 minutes. 0.4 g PEO intercalated clay (Laponite RDS) was added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Example 3

750 g polyetherimide (PEI) solution (solid content: 40%, organic solution including 350 g cresol, 70 g NMP, 30 g xylene) and 300.0 g polysilicic acid solution (60.0 g polysilicic acid) were poured into a 1000-ml beaker and were stirred with high speed under room temperature for 30 minutes. 40.0 g PEO intercalated clay (Laponite RDS) was added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Example 4

800 g polyamideimide (PAI) solution (solid content: 30%, organic solution including 460 g cresol, 70 g NMP, 30 g xylene) and 150.0 g polysilicic acid solution (30.0 g polysilicic acid) were poured into a 1000-ml beaker and were stirred with high speed under room temperature for 30 minutes. 30.0 g PEO intercalated clay (Laponite RDS) was added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Example 5

800 g polyetherimide (PEI) solution (solid content: 40%, organic solution including 320 g cresol, 70 g NMP, 30 g xylene) and 240.0 g polysilicic acid solution (48.0 g polysilicic acid) were poured into a 1000-ml beaker and were stirred with high speed under room temperature for 30 minutes. 32.0 g PEO intercalated clay (Laponite RDS) was added into the 1000-ml beaker, wherein molecular weight of PEO is 6,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Example 6

800 g polyetherimide (PEI) solution (solid content: 40%, organic solution including 320 g cresol, 70 g NMP, 30 g xylene) and 240.0 g polysilicic acid solution (48.0 g polysilicic acid) were poured into a 1000-ml beaker and were stirred with high speed under room temperature for 30 minutes. 32.0 g PEO intercalated clay (Laponite RDS) was added into the 1000-ml beaker, wherein molecular weight of PEO is 100,000, and a ratio of PEO to clay is 45:55. After being grounded and dispersed, a mixture in the 1000-ml beaker was deaerated under vacuum for 30 minutes to obtain a surge-resistant and abrasion resistant flexible insulating enamel of the present invention.

Comparative Example 1

900 g polyetherimide (PEI) solution (solid content: 40%, organic solution including 440 g cresol, 70 g NMP, 30 g xylene) and 40.0 g quaternary ammonium salts intercalated clay (Cloisite® 30B) were poured into a 1000-ml beaker and were stirred with high speed under room temperature for 30 minutes. After being grounded and dispersed, a mixture in the 1000-ml beaker was deaerated under vacuum for 30 minutes to obtain a comparative insulating enamel.

Comparative Example 2

700 g polyetherimide (PEI) solution (solid content: 40%, organic solution including 320 g cresol, 70 g NMP, 30 g xylene) and 360.0 g polysilicic acid solution (72.0 g polysilicic acid) were poured into a 1000-ml beaker and were stirred with high speed under room temperature for 30 minutes. 48.0 g quaternary ammonium salts intercalated clay (Cloisite® 30B) was added into the 1000-ml beaker. After being grounded and dispersed, a mixture in the 1000-ml beaker was deaerated under vacuum for 30 minutes to obtain a comparative insulating enamel.

Comparative Example 3

Polyamideimide (PAI) (solid content: 30%) was deaerated under vacuum for 30 minutes to obtain a comparative insulating enamel.

Comparative Example 4

800 g polyamideimide (PAI) solution (solid content: 30%, organic solution including 460 cresol, 70 g NMP, 30 g xylene) and 300.0 g polysilicic acid solution (60.0 g polysilicic acid) were poured into a 1000-ml beaker and were stirred with high speed under room temperature for 30 minutes. After being grounded and dispersed, a mixture in the 1000-ml beaker was deaerated under vacuum for 30 minutes to obtain a comparative insulating enamel.

Comparative Example 5

800 g polyamideimide (PAI) solution (solid content: 30%, organic solution including 460 g cresol, 70 g NMP, 30 g xylene) and 60.0 g PEO intercalated clay (Laponite RDS) were added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a surge-resistant and abrasion resistant flexible insulating enamel of the present invention.

Comparative Example 6

800 g polyamideimide (PAI) solution (solid content: 30%, organic solution including 460 cresol, 70 g NMP, 30 g xylene) and 30.0 g fused silica (purchased from Tatsumori) were poured into a 1000-ml beaker and were stirred with high speed under room temperature for 30 minutes. 30.0 g PEO intercalated clay (Laponite RDS) was added into the 1000-ml beaker, wherein molecular weight of PEO is 100,000, and a ratio of PEO to clay is 30:70. After being grounded and dispersed, a mixture in the 1000-ml beaker was deaerated under vacuum for 30 minutes to obtain a comparative insulating enamel.

The coating of each example or comparative example was coated around a conductor with any conventional procedure depending on viscosity of the coating, such as using dies, rollers, felt or other method that can be known by a person with ordinary skill in the art. The coating was coated around the conductor with a coating line-speed between 3 and 150 meters per minute. After the conductor was coated with the coating each time, the coating was dried and cured with a conventional oven. Temperature of the oven was controlled depending on composition of the coating, size of the oven, thickness of an insulating layer or the like.

In these examples and comparative examples, each coating was coated around a copper conductor with diameter of 1.024 mm, then was dried and cured in an oven with an input temperature between about 300 and 350° C. and an output temperature between about 350 and 700° C. to form an enameled wire with an insulating layer that has a thickness of 25 μm.

The enameled wires of the foregoing examples and comparative examples underwent tests to obtain their properties including flexibility, adhesion, thermal shock, breakdown voltage, elongation, softening temperature, abrasion assistance, and pot life of surge resistance. The test for determining the pot life of surge resistance of each enameled wire included providing 13 N loading into enameled wire, twisting the enameled wire eight times to obtain a bunch wire, putting the bunch wire in an oven (190° C.) of a surge-testing machine and turning on the surge-testing machine (440V, 30 Hz, surge: 1.2 KV↑) for measuring the pot life of surge resistance. Other tests were undertaken according to American National Standard for Electrical Power Insulators (NEMA) 1000 PART 3. The results of the enameled wires of the examples and comparative examples are shown in Table 2.

TABLE 2

|  | flexibility | adhesion | thermal shock | breakdown voltage (KV) | elongation (%) | softening temperature (° C.) | abrasion resistance (g) | pot life of surge resistance (H) |
| --- | --- | --- | --- | --- | --- | --- | --- | --- |
| ex. 1 | passed | passed | passed | 14.2 | 37.5 | 378 | 1835 | 166 |
| ex. 2 | passed | passed | passed | 13.6 | 36.8 | 374 | 1880 | 380 |
| ex. 3 | passed | passed | passed | 13.2 | 36.1 | 370 | 1900 | 425 |
| ex. 4 | passed | passed | passed | 14.0 | 39.0 | 386 | 2050 | 450 |
| ex. 5 | passed | passed | passed | 13.3 | 36.6 | 373 | 1890 | 410 |
| ex. 6 | passed | passed | passed | 13.3 | 36.6 | 373 | 1870 | 410 |
| comp. ex. 1 | failed | failed | failed | 12.6 | 35.0 | 355 | 1750 | 110 |
| comp. ex. 2 | failed | failed | failed | 11.8 | 30.5 | 320 | 1660 | 186 |
| comp. ex. 3 | passed | passed | passed | 14.5 | 40.0 | 390 | 1950 | 10 |
| comp. ex. 4 | passed | passed | passed | 13.5 | 36.5 | 380 | 1950 | 400 |
| comp. ex. 5 | passed | passed | passed | 13.1 | 36.0 | 360 | 1860 | 330 |
| comp. ex. 6 | passed | passed | passed | 13.7 | 37.5 | 360 | 1970 | 350 |

None of any inorganic material was added in the coating of the comparative example 3, so the insulating layer had good flexibility, adhesion and thermal shock properties, however, it had lower pot life of surge resistance (only 10 hours).

Quaternary ammonium salts intercalated clay was added in the coating of the comparative example 1, so the pot life of surge resistance of the insulating layer was increased to 110 hours. However, the quaternary ammonium salts affected the crosslinking density of the insulating polymer when the coating was being dried and cured, and then resulted in the brittle insulating layer. Accordingly, properties including flexibility, adhesion and thermal shock were failed.

Both quaternary ammonium salts intercalated clay and polysilicic acid solution were added in the coating of the comparative example 2, so the pot life of surge resistance of the insulating layer reached 186 hours. However, properties including flexibility, adhesion and thermal shock became failed.

In the above cases, clay and polysilicic acid were proved for elongating the pot life of surge resistance of the insulating layer.

Regarding example 1 of the present invention, the content of PEO intercalated clay and polysilicic acid were the lowest in all examples of the present invention. A ratio of resin to a combination of PEO intercalated clay and polysilicic acid was 95:5, so the pot life of surge resistance of the insulating layer was 166 hours, which was higher than those of the comparative examples 1 and 3 and close to that of the comparative example 2.

While the content of PEO intercalated clay and polysilicic acid increased, the pot life of surge resistance of the insulating layers were increased to 380 to 450 hours, wherein ratios of resin to a combination of PEO intercalated clay and polysilicic acid in examples 2 to 6 were from 80:20 to 75:25. The pot lives of surge resistance of the insulating layers in examples 2 to 6 were far beyond those in examples 1 to 3.

While only the polysilicic acid or PEO intercalated clay was added in the coating of the comparative examples 4 and 5 individually, all of the properties were lower than those of the combination of PEO intercalated clay and polysilicic acid added in example 4.

Both PEO intercalated clay and fused silica were added in the coating of the comparative example 6, the properties including breakdown voltage, elongation, softening temperature, abrasion resistance and pot life of surge resistance were inferior to those of the combination of PEO intercalated clay and polysilicic acid added in example 4. Furthermore, PEO can be bonded with resin and then exfoliate clay to distribute uniformly into the resin. And, the structure of PEO is soft to improve the flexibility of the insulating layer. Therefore, each insulating layer in all examples of the present invention had good flexibility, adhesion and thermal shock and had better break-down voltage, elongation, softening temperature and abrasion resistance than comparative examples 1 and 2.

Accordingly, the insulating enamel of the present invention was proved to have surge resistance, abrasion resistance and flexibility.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A surge-resistant and abrasion resistant flexible insulating enamel comprising:
    resin in an amount of 12 wt % to 76 wt % per 100 wt % by weight of the enamel, wherein the resin consists of polyamideimides (PAI), polyetherimides (PEI), polyesterimides and polyimides;
    an organic solvent in an amount of 20 wt % to 80 wt % per 100 wt % by weight of the enamel;
    polyethylene oxide (PEO) intercalated clay in an amount of 0.005 wt % to 16 wt % per 100 wt % by weight of the enamel; and
    polysilicic acid solution, wherein the polysilicis acid is present in an amount of 0.995 wt % to 16 wt % per 100 wt % by weight of the enamel, and the Si—OH functional groups in polysilicic acid are more than $10/nm.^2$.

2. The insulating enamel as claimed in claim 1, wherein the PEO intercalated clay has clay and PEO intercalation reagent intercalated in the clay and the clay is selected from the group consisting of smectites, micas and vermiculite, wherein the smectites are selected from the group consisting of montmorillonite, hectorite, laponite, saponite, sauconite, beidellite, stevensite and nontronite; and the micas are selected from the group consisting of chlorite, phlogopite, lepidolite, muscovite, biotite, paragonite, margarite, taeniolite and tetrasilicic mica.

3. The insulating enamel as claimed in claim 1, wherein the organic solvent is selected from the group consisting of phenol, hydrocarbon solvent, benzene, ester, ketone and a mixture thereof.

4. The insulating enamel as claimed in claim 2, wherein the organic solvent is selected from the group consisting of phenol, hydrocarbon solvent, benzene, ester, ketone and a mixture thereof.

5. The insulating enamel as claimed in claim 3, wherein the organic solvent is selected from the group consisting of cresol, dimethyl phenol, toluene, xylene, ethylbenzene, N,N-dimethylformamide (DMF), N-methylpyrrolidone (NMP) and a mixture thereof.

6. The insulating enamel as claimed in claim 4, wherein the organic solvent is selected from the group consisting of cresol, dimethyl phenol,toluene, xylene, ethylbenzene, N,N-dimethylformamide (DMF), N-methylpyrrolidone (NMP) and a mixture thereof.

7. The insulating enamel as claimed in claim 1, wherein a weight ratio of the PEO intercalation reagent to clay is from 20:80 to 45:55.

8. The insulating enamel as claimed in claim 5, wherein a weight ratio of the PEO intercalation reagent to clay is from 20:80 to 45:55.

9. The insulating enamel as claimed in claim 1, wherein a ratio of resin to a combination including the PEO intercalated clay and the polysilicic acid is from 95:5 to 60:40.

10. The insulating enamel as claimed in claim 8, wherein a ratio of resin to a combination including the PEO intercalated clay and the polysilicic acid is from 95:5 to 60:40.

11. The insulating enamel as claimed in claim 1, preferably, wherein a ratio of resin to a combination including the PEO intercalated clay and the polysilicic acid is from 90:10 to 70:30.

12. The insulating enamel as claimed in claim 8, preferably, wherein a ratio of resin to a combination including the PEO intercalated clay and the polysilicic acid is from 90:10 to 70:30.

13. The insulating coating as claimed in claim 1, wherein a ratio of resin to a combination including the PEO intercalated clay with layer structure and the polysilicic acid is from 80:20 to 75:25.

14. The insulating coating as claimed in claim 8, wherein a ratio of resin to a combination including the PEO intercalated clay with layer structure and the polysilicic acid is from 80:20 to 75:25.

15. The insulating enamel as claimed in claim 1, wherein a ratio of the PEO intercalated clay to the polysilicic acid is from 0.5:99.5 to 50:50.

16. The insulating enamel as claimed in claim 1, wherein molecular weight of PEO is between 600 and 1,000,000.

17. The insulating enamel as claimed in claim 1, wherein the polysilicic acid in polysilicic acid solution have an average size smaller than 50 nm; and the clay has an average particle size smaller than 20 .mu.m.

18. A surge-resistant and abrasion resistant flexible insulating enamel consisting of:
- resin in an amount of 12 wt % to 76 wt % per 100 wt % by weight of the enamel;
- an organic solvent in an amount of 20 wt % to 80 wt % per 100 wt % by weight of the enamel;
- polyethylene oxide (PEO) intercalated clay in an amount of 0.005 wt % to 16 wt % per 100 wt % by weight of the enamel; and
- polysilicic acid in an amount of 0.995 wt % to 16 wt % per 100 wt % by weight of the enamel.

* * * * *